US011455277B2

(12) United States Patent
Singh et al.

(10) Patent No.: US 11,455,277 B2
(45) Date of Patent: Sep. 27, 2022

(54) VERIFYING SNAPSHOT INTEGRITY

(71) Applicant: Nutanix, Inc., San Jose, CA (US)

(72) Inventors: Bhawani Singh, Bangalore (IN);
Galaxy Kadiyala, Hyderabad (IN);
Tony Joseph, Bangalore (IN)

(73) Assignee: Nutanix Inc., San Jose, CA (US)

( * ) Notice: Subject to any disclaimer, the term of this patent is extended or adjusted under 35 U.S.C. 154(b) by 533 days.

(21) Appl. No.: 16/526,977

(22) Filed: Jul. 30, 2019

(65) Prior Publication Data

US 2020/0311025 A1   Oct. 1, 2020

Related U.S. Application Data

(60) Provisional application No. 62/824,860, filed on Mar. 27, 2019.

(51) Int. Cl.
*G06F 16/10* (2019.01)
*G06F 16/11* (2019.01)
*G06F 21/64* (2013.01)

(52) U.S. Cl.
CPC ............ *G06F 16/128* (2019.01); *G06F 21/64* (2013.01)

(58) Field of Classification Search
None
See application file for complete search history.

(56) References Cited

U.S. PATENT DOCUMENTS 5,390,327 A  2/1995  Lubbers et al.
7,716,435 B1  5/2010  Allen
7,841,010 B2  11/2010  Lerouge et al.
8,402,309 B2  3/2013  Timashev et al.
8,549,518 B1  10/2013  Aron et al.
8,601,473 B1  12/2013  Aron et al.
(Continued)

FOREIGN PATENT DOCUMENTS

CN          110018986 A          7/2019

OTHER PUBLICATIONS

Poitras, Steven. "The Nutanix Bible" (Feb. 3, 2020), from https://nutanixbible.com/ (Publication date based on indicated capture date by Archive.org; first publication date unknown).

(Continued)

*Primary Examiner* — Belix M Ortiz Ditren
(74) *Attorney, Agent, or Firm* — Vista IP Law Group, LLP

(57) ABSTRACT

Systems and computer program products for highly available computing systems. Techniques for verifying a replicated snapshot integrity includes steps for storing a snapshot at a first computing system where the snapshot has a corresponding first data integrity value (e.g., a checksum). Another storing operation stores a replica snapshot as two or more portions at respective two or more computing nodes of a second computing system. A second data integrity value that corresponds to the snapshot that was stored at the two or more computing nodes is calculated. Corruption is detected by comparing the first data integrity value to the second data integrity value. Corruption of a to-be-assembled snapshot can be detected before incurring the cost of assembly of the two or more portions of a replica snapshot. Alternative snapshots that can be assembled from alternative portions are considered for assembly. Only uncorrupted snapshots are restored to a designated computing system.

25 Claims, 12 Drawing Sheets

(56) References Cited

U.S. PATENT DOCUMENTS

| | | | |
|---|---|---|---|
| 8,799,413 | B2 | 8/2014 | Taylor et al. |
| 8,850,130 | B1 | 9/2014 | Aron et al. |
| 8,977,602 | B2 | 3/2015 | Shoens |
| 8,983,915 | B2 | 3/2015 | Mutalik et al. |
| 9,158,630 | B1 | 10/2015 | Natanzon |
| 9,264,414 | B2 | 2/2016 | Gargate |
| 9,563,517 | B1 | 2/2017 | Natanzon et al. |
| 9,613,064 | B1 | 4/2017 | Chou et al. |
| 9,772,866 | B1 | 9/2017 | Aron et al. |
| 10,372,554 | B1 | 8/2019 | Natanzon et al. |
| 10,459,632 | B1 * | 10/2019 | Chen ................. G06F 3/0616 |
| 2010/0088745 | A1 | 4/2010 | Song et al. |
| 2010/0114832 | A1 | 5/2010 | Lillibridge et al. |
| 2013/0325824 | A1 | 12/2013 | Shoens |
| 2014/0181579 | A1 | 6/2014 | Whitehead et al. |
| 2016/0042024 | A1 | 2/2016 | Campanotti et al. |
| 2017/0242599 | A1 | 8/2017 | Patnaik et al. |
| 2017/0308420 | A1 | 10/2017 | Korotaev et al. |

OTHER PUBLICATIONS

Poitras, Steven. "The Nutanix Bible" (Aug. 1, 2020), from https://nutanixbible.com/ (Publication date based on indicated capture date by Archive.org; first publication date unknown).

Poitras, Steven. "The Nutanix Bible" (Jan. 30, 2021), from https://nutanixbible.com/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Poitras, Steven. "The Nutanix Bible" (Jul. 9, 2019), from https://nutanixbible.com/(Publication date based on indicated capture date by Archive.org; first publication date unknown).

Cano, I. et al., "Curator: Self-Managing Storage for Enterprise Clusters", *14th USENIX Symposium on Networked Systems Design and Implementation, NSDI '17*, (Mar. 27, 2017).

IBM Corporation, "End-to-end checksum", IBM Knowledge Center (last updated Apr. 19, 2019).

Red Hat, "Chapter 19. Detecting Data Corruption With Bitrot", Red Hat Customer Portal, (Jul. 29, 2015), date retrieved from google.

Redis Labs, "4.3.1 Verifying snapshots and append-only files", e-Book—Redis in Action, (Sep. 29, 2015), date retrieved from google.

Amazon, "Restoring an Amazon EBS Volume from a Snapshot", AWS User Guide for Linux Instances, (Dec. 6, 2013), date retrieved from google.

Amazon, "Amazon EBS Snapshots", AWS User Guide for Linux Instances, (May 13, 2016).

BLAKE2, "BLAKE2—fast secure hashing", (Modified on Feb. 22, 2017), from https://blake2.net/.

Commvault, "Nutanix Hyper-Converged Infrastructure", (Oct. 5, 2015), date retrieved from google.

Commvault, "Commvault for Nutanix™ Files", (Mar. 28, 2020), date retrieved from google.

Veeam, "Nutanix and Veeam #1 Cloud Data Management for the Nutanix Enterprise Cloud", Solution Brief, (Mar. 29, 2019).

Commvault, "Commvault for Nutanix™ Acropolis Hypervisor (AHV)", Resource Library—Datasheet and Brochure, (Jul. 27, 2018), date retrieved from google.

Veeam, "Release Information for Veeam Availability for Nutanix AHV 1.0 Update 3", Veeam Software, (Oct. 9, 2019).

Veeam, "Nutanix and Veeam Better Together", (Nov. 14, 2019), date retrieved from google.

Dell'Oca, L. et al.,"Key traits of Availability for the Modern Data Center", Veeam video, (Jun. 2014), from https://www.veeam.com/videos/nutanix-veeam-data-center-4361.html.

Veeam, "Veeam Backup Validator", User guide for VMware vSphere, (updated on Jan. 6, 2020).

Veeam, "Script to create active full backups on Veeam Availablity for Nutanix AHV 1.0", (Dec. 27, 2019).

Grover, S., "Commvault Extends Support to Nutanix Files", (Mar. 20, 2019).

* cited by examiner

VERIFYING SNAPSHOT INTEGRITY

RELATED APPLICATIONS

The present application claims the benefit of priority to U.S. Patent Application Ser. No. 62/824,860 titled "VERIFYING REPLICATED SNAPSHOT INTEGRITY", filed on Mar. 27, 2019, which is hereby incorporated by reference in its entirety.

FIELD

This disclosure relates to highly available computing systems, and more particularly to techniques for verifying snapshot integrity.

BACKGROUND

Users of modern computing systems often have an expectation that the data, applications, services, and/or other computing resources of the systems are always available or "highly available" even if/when some sort of failure occurs. However certain systems are very complex possibly involving computing clusters that comprise hundreds of nodes that host thousands of virtualized entities (e.g., virtual machines, virtual disks, virtual NICs, etc.) and massive amounts of distributed data and metadata. Nevertheless, users expect that each virtualized entity (VE) and/or block of data will always be able to be recovered and made ready for use even in event that some sort of failure had occurred.

Providers of such complex computing systems implement various techniques to satisfy the foregoing user expectations. One such technique collects snapshots of system states at certain moments in time. Such snapshots (e.g., frequent incremental backups of the data) are used to restore the computing system to an operational state that was present prior to some failure. For further data protection, the snapshots are often replicated and stored in a secondary computing system that is separate from the primary computing system. For example, snapshots from a first computing system (e.g., primary site or cluster) might be replicated to a second computing system (e.g., secondary site or cluster), and sometimes to more replication sites. In the event of a failure at the first computing system, one or more of the replicated snapshots at a second computing system can be accessed to restore the first computing system to a certain state, or the replicated snapshots at a second computing system can be used to facilitate a failover (e.g., a failover to the second computing system.

Given the very high reliability of modern computing systems, the replicated snapshots might be retained for long periods of time before being accessed. In some cases, certain replicated snapshots might be retained for many years or more. During such retention periods, a replicated snapshot can become corrupted or otherwise lose its integrity at the computing system storing the replicated snapshot. Strictly as examples, a replicated snapshot might get corrupted due to a hardware problem (e.g., a bad block on a storage device), or might get corrupted due to a malware (e.g., ransomware) attack, or might get corrupted when executing certain data management operations (e.g., compression operations, deduplication operations, etc.). Such corrupted replicated snapshots should not be used to perform any of the foregoing disaster recovery (DR) operations (e.g., restore, failover, etc.) since they not only will fail to provide the desired DR outcome, but may also (e.g., if corrupted by malware) cause other undesired behaviors.

Unfortunately, if the presence of corruption in any portion of the replicated snapshot is not detected before the replicated snapshot is assembled and/or used in restoration operations, then the data being restored after a failure will be corrupted. It is possible that a replicated snapshot may be accessed (e.g., by filename, object identifier, etc.) and retrieved without error or indication that the replicated snapshot is corrupted. However, during or after execution of the recovery operations (e.g., restore, failover, etc.), the corruption of the replicated snapshot will become manifest—usually in unwanted ways. This problem is further complicated by the fact that replicated snapshots stored in modern distributed computing environments are often divided into portions (e.g., data blocks, or extent groups) that are distributed across many different storage devices of many different computing nodes. Such distribution across many different computing nodes increases the likelihood that corruption of a particular replicated snapshot might occur (e.g., due to the involvement of many computing nodes having many different storage devices, each of which has its own device-specific likelihood of failure). Moreover, the process of reassembling the distributed portions into the replicated snapshots might be costly (e.g., when the distributed portions need to be transmitted over a network) and/or the process of reassembling the distributed portions into the replicated snapshots might introduce corruption into the reassembled snapshots. What is needed is a way to verify the integrity of a replicated snapshot before incurring costly operations.

SUMMARY

The present disclosure describes techniques used in systems, methods, and in computer program products for verifying replicated snapshot integrity. More specifically, the present disclosure describes techniques used in systems, methods, and in computer program products for verifying the integrity of replicated snapshots in distributed computing environments. Certain embodiments are directed to technological solutions for checking the integrity of portions of replicated snapshots that are distributed over multiple storage devices to determine the integrity of those portions of the replicated snapshots.

Various applications of the herein-disclosed improvements in computer functionality serve to reduce demands for computer memory, reduce demands for computer processing power, reduce network bandwidth usage, and reduce demands for intercomponent communication. For example, when performing computer operations that address the various technical problems that arise upon discovering that a replicated snapshot is corrupted, memory usage, network bandwidth needed, and CPU cycles demanded are significantly reduced as compared to the memory usage, network bandwidth and CPU cycles that would be needed but for practice of the herein-disclosed techniques. Strictly as one example, the data structures disclosed herein, and their use serve to reduce or eliminate network communications for moving data that would ordinarily occur, but for the practice of the herein-disclosed techniques that verify checksums of snapshot components before moving the corresponding data across a network. As another example of how the herein-disclosed improvements in computer functionality serve to reduce demands for computer resources, rather than expend resources to remediate after performing disaster recovery operations using corrupted replicated snapshots, the herein disclosed techniques facilitate identification of corrupted replicated snapshots prior to performing such disaster recovery operations, thereby eliminating the foregoing wasteful expenditure of resources.

Many of the herein-disclosed embodiments for checking the integrity of the portions of replicated snapshots distributed over multiple storage devices are technological solutions pertaining to technological problems that arise in the hardware and software arts that underlie clustered, distributed computing systems. Specifically, the herein-disclosed embodiments pertain to managing the integrity of snapshots that are partitioned and stored over a plurality of storage devices in such clustered, distributed computing systems. Aspects of the present disclosure achieve performance and other improvements in peripheral technical fields including (but not limited to) hyperconverged computing platform management and virtualized computing systems.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
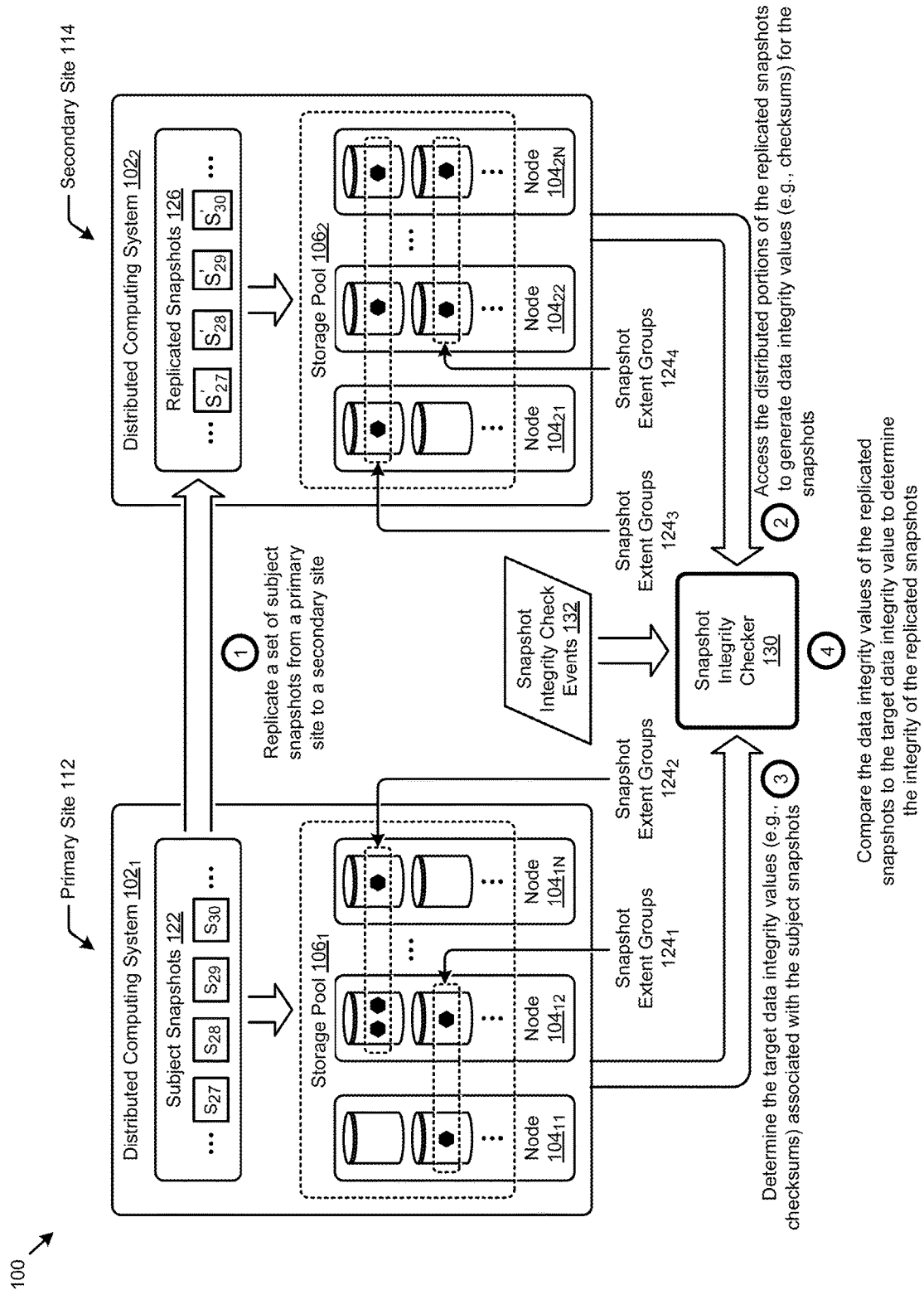
FIG. 1 exemplifies a computing environment in which embodiments of the present disclosure can be implemented.

Aspects of the present disclosure solve problems associated with discovering that a replicated snapshot or a portion thereof has been corrupted. These problems are unique to—and may have been created by implementation of various computer-implemented techniques for storing replicated snapshots over multiple computing nodes. Some embodiments are directed to approaches for checking the integrity of each separately-stored portions of replicated snapshots, which portions have been distributed over multiple storage devices. The accompanying figures and discussions herein present example environments, systems, methods, and computer program products for verifying the integrity of a to-be assembled snapshot before incurring the expense of operations for actually assembling the snapshot from the separately-stored portions, and before propagating a corrupted snapshot to any other computing system (e.g., in a restore operation, or in a failover operation).

Overview

Disclosed herein are techniques for checking the integrity of the portions of replicated snapshots that are distributed over multiple storage devices to determine the integrity of the replicated snapshot as a whole. In example embodiments, a distributed computing system stores replicated snapshots over a plurality of storage devices. At certain moments in time, events are raised to determine the integrity of the replicated snapshots. In response to an event pertaining to a particular replicated snapshot, a data structure is accessed to identify the physical storage locations of the portions of the replicated snapshot. For example, the contents of the logical object representing the replicated snapshot may be distributed over the physical storage devices of various nodes comprising the distributed computing system. The portions of the replicated snapshot are then accessed to determine a respective data integrity value for each portion.

The respective data integrity values and/or the data comprising the portions are analyzed to form a data integrity value that corresponds to the entire replicated snapshot. The data integrity value is then used to confirm the then-current data integrity status of the replicated snapshot. As an example, the aforementioned data integrity value of the replicated snapshot might be compared to an initial data integrity value that was established when the replicated snapshot was first generated. If the two data integrity values are equal, then the data integrity status of the replicated snapshot is characterized as uncorrupted (e.g., high integrity). If the data integrity values are not equal, then the data integrity status of the replicated snapshot is characterized as corrupted (e.g., having at least one form of compromised integrity).

An indication of the then-current data integrity status of the replicated snapshot is recorded for various purposes. In certain embodiments, disaster recovery operations using the verified replicated snapshot are initiated. In certain embodiments, integrity checks are performed by background tasks. In certain embodiments, the results of the foregoing background tasks are and recorded in a persistent data structure. In certain embodiments, the foregoing background tasks raise alerts if and when corruption of a replicated snapshot is detected. In some embodiments, the alert specifies the particular storage device that holds the corrupted data.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 exemplifies a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates aspects pertaining to checking the integrity of replicated snapshots that have been distributed over multiple storage devices. Specifically, the figure presents a logical depiction of how the herein disclosed techniques can be implemented in an environment comprising distributed computing systems to verify the integrity of replicated snapshots and/or other snapshots and/or other data items stored in a distributed manner over the distributed computing systems.

The logical depiction of FIG. 1 illustrates a distributed computing system $102_1$ that comprises three representative computing nodes (e.g., node $104_{11}$, node $104_{12}$, . . . , node $104_{1N}$) that each have one or more storage devices. The plurality of storage devices (e.g., solid state drives (SSDs), hard disk drives (HDDs), etc.) associated with the nodes constitute a storage pool $106_1$ that is accessed by certain resources implemented at distributed computing system $102_1$. For example, certain virtual machines (VMs) implemented at the nodes might access virtual disks (vDisks) that comprise data that is physically distributed over the storage devices in storage pool $106_1$. More specifically, a vDisk is a logical file that comprises extents (e.g., 1 MB sets of logically contiguous data) which are grouped into data blocks and/or extent groups (e.g., 1 MB to 4 MB sets of physically contiguous data) that are stored on one or more storages devices in storage pool $106_1$. The extents are dynamically distributed among the extent groups and respective storage devices in accordance with various performance objectives (e.g., load balancing).

To comply with the certain agreements, policies, and general expectations pertaining to high availability of the resources and data of distributed computing system $102_1$, a set of subject snapshots 122 (e.g., . . . , $S_{27}$, $S_{28}$, $S_{29}$, $S_{30}$, . . . ) are collected and stored at distributed computing system $102_1$. Some instances of subject snapshots 122 might pertain to snapshots of vDisks. In this case, the snapshots are immutable copies of the vDisks at a particular point in time. As such, the underlying data of the snapshots are distributed (e.g., in snapshot extent groups $124_1$, snapshot extent groups $124_2$, etc.) over the storage devices of storage pool $106_1$. In other cases, a snapshot might capture the configuration of certain resources (e.g., VMs, etc.) at a particular point in time. The underlying data of such snapshots may also be distributed over storage pool $106_1$ (e.g., according to certain performance objectives).

As illustrated, to further protect the data associated with subject snapshots 122, the snapshots are replicated to distributed computing system $102_2$ as a set of replicated snapshots 126 (operation 1). In this case, distributed computing system $102_1$ can be considered a primary site 112 and distributed computing system $102_2$ can be considered a secondary site 114. In some cases, subject snapshots 122 are replicated to multiple sites. Secondary site 114 is often selected to be in an availability domain that is separate from the availability domain of primary site 112 so that failures at primary site 112 do not affect the secondary site 114. As such, replicated snapshots 126 (e.g., . . . , $S'_{27}$, $S'_{28}$, $S'_{29}$, $S'_{30}$, . . . ) can be used to perform certain disaster recovery (DR) operations should a failure occur at primary site 112. For example, certain instances of replicated snapshots 126 might be retrieved to restore various resources (e.g., VMs, vDisks, etc.) at primary site 112 to a particular state. As another example, instances of replicated snapshots 126 might be used to failover certain resources (e.g., VMs, vDisks, etc.) from primary site 112 to secondary site 114.

As with distributed computing system $102_1$, distributed computing system $102_2$ will also distribute the data underlying the replicated snapshots 126 over a storage pool $106_2$ that comprises a plurality of storage devices associated with a set of nodes (e.g., node $104_{21}$, node $104_{22}$, . . . , node $104_{2N}$) in the system. Specifically, the data associated with replicated snapshots 126 are distributed over various extent groups (e.g., snapshot extent groups $124_3$, snapshot extent groups $124_4$, etc.) that are stored at the storage devices in storage pool $106_2$.

As discussed earlier, one or more of the replicated snapshots 126 can become corrupted or otherwise lose their integrity at distributed computing system $102_2$. Strictly as examples, a replicated snapshot might get corrupted due to a hardware problem (e.g., a bad block on a storage device), or might get corrupted due to a malware (e.g., ransomware) attack, or might get corrupted when executing certain data management operations (e.g., compression operations, deduplication operations, etc.) at the system.

Such corrupted replicated snapshots should not be used to perform the aforementioned DR operations (e.g., restore, failover, etc.) since they will not only fail to provide the desired DR outcome, but may also (e.g., if corrupted by malware) cause further undesired behaviors. In many cases, the corruption of a particular replicated snapshot is not discovered until the DR operations have been executed and computing resources to execute the DR operations have been expended.

Furthermore, the distributed nature of the data underlying the replicated snapshots increases the likelihood that a corruption of a particular replicated snapshot might occur (e.g., due to the involvement of many storage devices, each of which storage device has its own device-specific likelihood of failure). More specifically, when a snapshot is distributed over many devices (e.g., many different computing nodes, and/or many different storage devices), the chance of failure increases with the number of devices.

The herein disclosed techniques address the problems attendant to discovering that a replicated snapshot is corrupted during or after executing disaster recovery operations at least in part by implementing one or more instances of a snapshot integrity checker 130 in computing environment 100. Snapshot integrity checker 130 responds to instances of snapshot integrity check events 132 to verify the integrity of some or all of replicated snapshots 126. The snapshot integrity check events 132 might be associated with disaster recovery operations, background replication management operations, and/or other operations. In some cases, such events may invoke certain snapshot integrity check requests that are issued to snapshot integrity checker 130.

In response to an event and/or corresponding request associated with a particular replicated snapshot (e.g., from replicated snapshots 126), snapshot integrity checker 130 identifies the physical storage locations of the portions (e.g., extent groups) of the replicated snapshot distributed over storage pool $106_2$. The portions of the replicated snapshot are then accessed to determine a data integrity value such as a checksum for the replicated snapshot (operation 2). For example, the respective data integrity values of the portions can be combined to form a data integrity value that corresponds to the entire replicated snapshot. A target data integrity value (e.g., a checksum of a particular subject snapshot) is determined (operation 3). In some cases, the target data integrity value was recorded when the subject snapshot was first replicated. In other cases, the target data integrity value is determined from a combination of the respective checksums of the portions of the subject snapshot that is distributed over storage pool $106_1$.

The data integrity value of the replicated snapshot is then compared to the target data integrity value to determine the then-current integrity of the replicated snapshot (operation 4). As an example, if the data integrity value of the replicated snapshot equals the target data integrity value, then the replicated snapshot is characterized as uncorrupted (e.g., high integrity). If the data integrity values are not equal, then the replicated snapshot is characterized as corrupted (e.g., compromised integrity).

The foregoing replicated snapshot integrity verification capabilities facilitated by the herein disclosed techniques results in improvements in computer functionality that serve to reduce the demand for computer processing power, reduce the demand for computer memory and data storage, reduce network bandwidth use, and reduce the demand for intercomponent communication in computing environments. Specifically, rather than expend resources to perform disaster recovery operations using corrupted replicated snapshots, the herein disclosed techniques facilitate identification of corrupted replicated snapshots prior to performing such disaster recovery operations, thereby eliminating the foregoing expenditure of resources. More specifically, the consumption of computing, storage, networking, and other resources to execute a set of failed disaster recovery operations, identify root causes (e.g., corrupted snapshots) of the failed data recovery operations, discover alternative uncorrupted snapshots, and/or perform other computing operations is eliminated.

One embodiment of techniques for verifying snapshot integrity is disclosed in further detail as follows.

Figure 2:
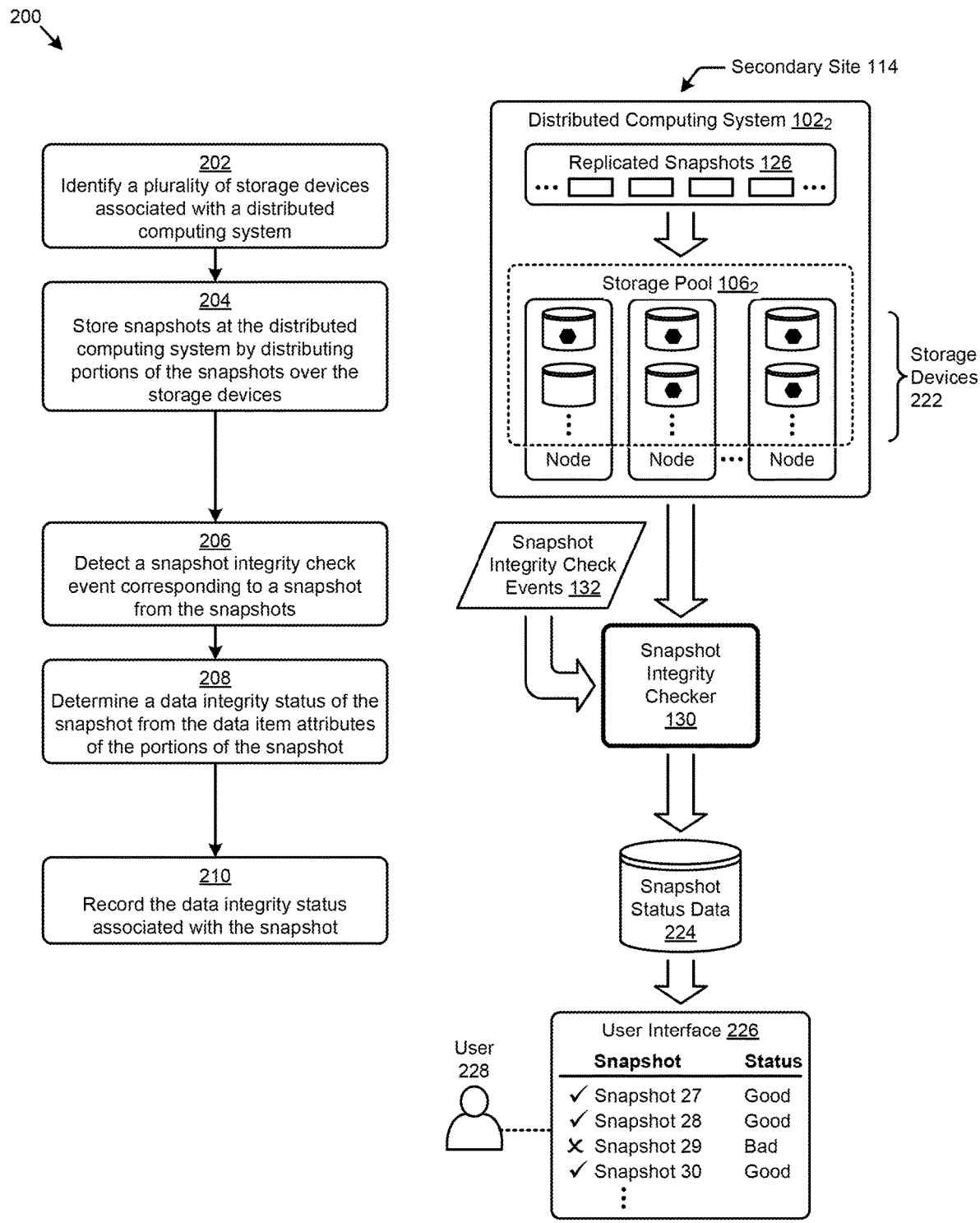
FIG. 2 presents a snapshot integrity verification technique as implemented in systems that verify the integrity of replicated snapshots in distributed computing environments, according to an embodiment.

FIG. 2 presents a snapshot integrity verification technique 200 as implemented in systems that verify the integrity of replicated snapshots in distributed computing environments. As an option, one or more variations of snapshot integrity verification technique 200 or any aspect thereof may be implemented in the context of the architecture and functionality of the embodiments described herein. The snapshot integrity verification technique 200 or any aspect thereof may be implemented in any environment.

FIG. 2 illustrates aspects pertaining to checking the integrity of replicated snapshots that have been distributed over multiple storage devices. Specifically, the figure is presented to illustrate one embodiment of certain high order steps and/or operations that facilitate determining a data integrity status of a snapshot (e.g., replicated snapshot) that is stored over a plurality of storage devices in a distributed computing system. A representative scenario is also shown in the figure to illustrate an example application of snapshot integrity verification technique 200.

Snapshot integrity verification technique 200 commences with identifying a plurality of storage devices that are associated with a distributed computing system (step 202). As illustrated in the scenario of FIG. 2, the aforementioned storage devices and distributed computing system might be a set of storage devices 222 in storage pool $106_2$ of distributed computing system $102_2$. Various snapshots at the distributed computing system are stored by distributing portions of each snapshot over the storage devices (step 204). For example, distributed computing system $102_2$ might be a secondary site 114 that receives a set of replicated snapshots 126 from a primary site and allocates the various extents of the snapshots to extent groups stored at storage devices 222 in storage pool $106_2$.

When a snapshot integrity check event corresponding to one of the snapshots is detected (step 206), a data integrity status of the snapshot is determined from certain data item attributes associated with the portions of the snapshot (step 208). As an example, a snapshot integrity checker 130 might detect an instance of snapshot integrity check events 132 that corresponds to one of the replicated snapshots 126. In response to detecting the event, snapshot integrity checker 130 accesses the extent groups of the replicated snapshot stored over storage devices 222 to determine certain data item attributes of the extent group data that are combined to conclude a data integrity status of the replicated snapshot.

Such data item attributes comprise identification attributes, and/or location attributes, and/or additional features or qualities of a data item (e.g., a snapshot portion or a snapshot extent group). As merely one example, a data item attribute of a particular data item might be the data integrity value or checksum of the data item. There are many techniques to form a data integrity. A very common technique to form a data integrity value for a data item is to calculate a checksum over the data item. As such, the term data integrity value and the term checksum are used interchangeably herein.

Checksums might be derived from a hash of the underlying data of the data item. In some cases, the checksum may also include other information (e.g., iNode identifier, object identifier, filename, file directory, etc.) associated with the data item.

Any hashing function can be used (e.g., using an MD5 checksum, or a SHA-1 checksum, or a Blake value, etc.), however certain hashing functions are preferred due to their speed, security and/or their ability to be applied in an order-independent fashion over many constituent portions of a snapshot.

A data integrity status is an indicator of some measure of integrity associated with a particular data item. A data integrity status is often assigned to one of two binary states that indicate the data item either has integrity (e.g., is not corrupted) or does not have integrity (e.g., is corrupted). More specifically, the data integrity status of a snapshot might be represented as "good" or "bad" based at least in part on the data item attributes (e.g., checksums) of the stored portions of the snapshot.

When the data integrity status of the snapshot is determined, the data integrity status is recorded for various purposes (step 210). As shown, the data integrity status might be stored in a set of snapshot status data 224 for use by various processes. As merely one example, snapshot status data 224 might be accessed to present a snapshot integrity status in a user interface 226 associated with a user 228 (e.g., system administrator).

One embodiment of a system, data flows, and data structures for implementing the snapshot integrity verification technique 200 and/or other herein disclosed techniques is disclosed as follows.

Figure 3A:
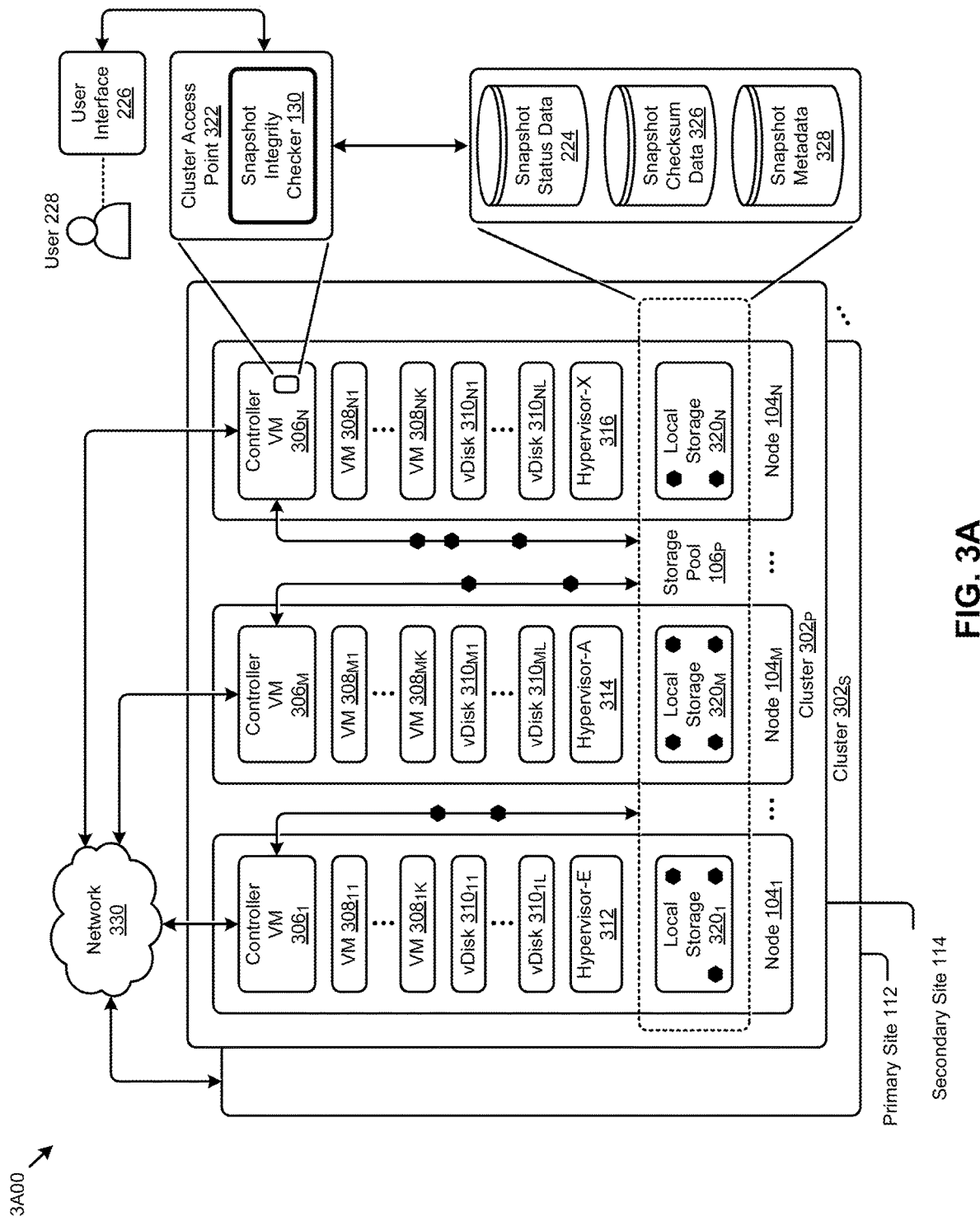
FIG. 3A is a block diagram of a system that implements integrity checking of replicated snapshots in distributed computing environments, according to an embodiment.

FIG. 3A is a block diagram of a system 3A00 that implements integrity checking of replicated snapshots in distributed computing environments. As an option, one or more variations of system 3A00 or any aspect thereof may be implemented in the context of the architecture and functionality of the embodiments described herein. The system 3A00 or any aspect thereof may be implemented in any environment.

FIG. 3A illustrates aspects pertaining to checking the integrity of replicated snapshots that have been distributed over multiple storage devices. Specifically, the figure is being presented to show one embodiment of certain representative components and associated data flows that describes how the herein disclosed techniques might be implemented in a modern computing system (e.g., hyperconverged distributed computing system). The components and data flows shown in FIG. 3A present one partitioning and associated data manipulation approach. The specific example shown is purely exemplary, and other subsystems, data structures, and/or partitioning are reasonable.

As shown in FIG. 3A, system 3A00 comprises two representative computing clusters (e.g., cluster $302_P$, . . . , cluster $302_S$) that correspond to a primary site 112 and a secondary site 114 earlier described. Further details of cluster $302_P$ are shown to illustrate one cluster configuration that facilitates an implementation of the herein disclosed techniques. Specifically, cluster $302_P$ comprises three representative nodes (e.g., node $104_1$, . . . , node $104_M$, . . . , and node $104_N$) that have multiple tiers of storage in a storage pool $106_P$. Each node can be associated with one server, multiple servers, or portions of a server. The nodes can be associated (e.g., logically and/or physically) with one or more computing clusters (e.g., cluster $302_P$).

The multiple tiers of storage of storage pool $106_P$ can include instances of local storage (e.g., local storage $320_1$, . . . , local storage $320_M$, . . . , local storage $320_N$). For example, the local storage can be within or directly attached to a server and/or appliance associated with the nodes. Such local storage can include SSDs, HDDs, and/or other storage devices. In some embodiments, the multiple tiers of storage can include storage that is accessible through a network 330, such as a networked storage (e.g., a storage area network (SAN), network attached storage (NAS), etc.).

As shown, any of the nodes of system 3A00 can implement one or more virtualized entities, such as virtual machines (e.g., VM $308_{11}$, VM $308_{1K}$; VM $308_{M1}$, . . . , VM $308_{MK}$; VM $308_{N1}$, . . . , VM $308_{NK}$; controller VM $306_1$, . . . , controller VM $306_M$, . . . , and controller VM $306_N$), virtual disks (e.g., vDisk $310_{11}$, vDisk $310_{1L}$; vDisk $310_{M1}$, . . . , vDisk $310_{ML}$; vDisk $310_{N1}$, vDisk $310_{NL}$) and/or executable containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system, while the VMs run multiple applications on various respective guest operating systems. Such flexibility can be facilitated at least in part by one of a variety of heterogeneous hypervisors (e.g., hypervisor-E 312, hypervisor-A 314, and/or hypervisor-X 316), which hypervisors are logically located between the various guest operating systems of the VMs and the host operating system of the physical infrastructure (e.g., the nodes).

As an alternative, executable containers may be implemented at the nodes in an operating system-based virtualization environment or container virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system without, in most cases, a hypervisor layer. This lightweight implementation can facilitate efficient distribution of certain software components such as applications or services (e.g., micro-services). Any node of system 3A00 can implement both a hypervisor-assisted virtualization environment and a container virtualization environment for various purposes.

Furthermore, any node in system 3A00 can implement a virtualized controller to facilitate, at least in part, access to storage facilities (e.g., storage pool $106_P$, networked storage, etc.) by the VMs and/or the executable containers operating at the node. As used in these embodiments, a virtualized controller is a collection of software instructions that serve to abstract details of underlying hardware or software components from one or more higher-level processing entities. A virtualized controller can be implemented as a virtual machine as an executable container (e.g., a Docker container), or within a layer (e.g., such as a layer in a hypervisor). As can be observed in system 3A00, an instance of a virtual machine (e.g., controller VM $306_1$, . . . , controller VM $306_M$, and controller VM $306_N$) at each node is used as a virtualized controller to, at least in part, manage storage and I/O (input/output or IO) operations at the nodes.

As part of managing the storage and I/O operations, the controller VMs manage the mapping of the vDisk extents to the extent groups distributed over storage pool $106_P$. Furthermore, the controller VMs of the nodes in system 3A00 interact using communications over network 330. Such interaction includes both intra-cluster (e.g., within cluster $302_P$) communications and inter-cluster (e.g., between cluster $302_P$ and cluster $302_S$) communications. For example, one or more controller VMs at cluster $302_P$ can interact with one or more controller VMs at cluster $302_S$ to replicate snapshots from primary site 112 to secondary site 114.

The virtualized entities at the nodes of system 3A00 can interface with the controller VM of the node through a respective hypervisor. In such cases, the controller VM is not formed as part of specific implementations of a given hypervisor. Instead, the controller VM can run as a virtual machine above the hypervisor at the various nodes. When the controller VMs run above the hypervisors, varying virtual machine architectures and/or hypervisors can operate with the system 3A00. For example, a hypervisor (e.g., hypervisor-E 312) at one node might correspond to software from a first vendor (e.g., VMware), and a hypervisor (e.g., hypervisor-A 314) at another node might correspond to a second software vendor (e.g., Nutanix). As another virtualized controller implementation example, executable containers (e.g., Docker containers) can be used to implement a virtualized controller in an operating system virtualization environment at a given node. In this case, for example, the virtualized entities at a particular node can interface with a controller container through a hypervisor and/or the kernel of the host operating system of the node.

In addition to managing the I/O operations, the controller VMs are often involved in other intra-node and/or inter-node operations at their respective nodes. As such, the controller VMs are privy to various aspects of their respective nodes, such as the data, conditions, configurations, performance, activities, events, and/or other characteristics associated with both the virtualized entities and physical resources at the nodes. The foregoing characteristics of the controller VMs make them good candidates for managing the collection and storage of snapshots associated with the cluster. As illustrated, the controller VMs can allocate certain portions of snapshots over various extent groups associated with the storage devices in storage pool $106_P$. The snapshot portions in storage pool $106_P$ are available to any of the nodes of cluster $302_P$.

As illustrated, an instance of a snapshot integrity checker 130 is implemented at cluster $302_P$ to facilitate the herein disclosed techniques. Specifically, snapshot integrity checker 130 is implemented in a cluster access point 322 hosted by controller VM $306_N$ at node $104_N$. As an example, node $104_N$ might be selected as a leader node at cluster $302_P$ to host the cluster access point 322. In some cases, an instance of snapshot integrity checker 130 can be implemented at each controller VM of each node in a cluster. In such cases, the operations performed by the snapshot integrity checker can be performed at a single node or multiple nodes. For example, various tasks to carry out the operations of the snapshot integrity checker might be allocated (e.g., by a leader node) over multiple nodes to achieve a certain load balancing objective associated with system 3A00.

As shown, snapshot integrity checker 130 or any instance of snapshot integrity checker at cluster $302_P$ accesses a set of shared snapshot data that is stored in storage pool $106_P$. Specifically, a set of snapshot metadata 328 is accessed to facilitate discovery of the physical storage locations (e.g., extent groups) of the portions of snapshots (e.g., subject snapshots, replicated snapshots, etc.) distributed over storage pool $106_P$. A set of snapshot checksum data 326 codifies the checksums and/or other information associated with the snapshots and/or the portions of the snapshots. Furthermore, the snapshot status data 224 is accessed by snapshot integrity checker 130 to record the data integrity status of the snapshots associated with cluster $302_P$ for various purposes. For example, cluster access point 322 might present various views of snapshot integrity data in user interface 226 associated with user 228 (e.g., system administrator).

Further details of the data structures associated with the foregoing shared snapshot data and/or other data objects accessed by the herein disclosed techniques are disclosed as follows.

Figure 3B:
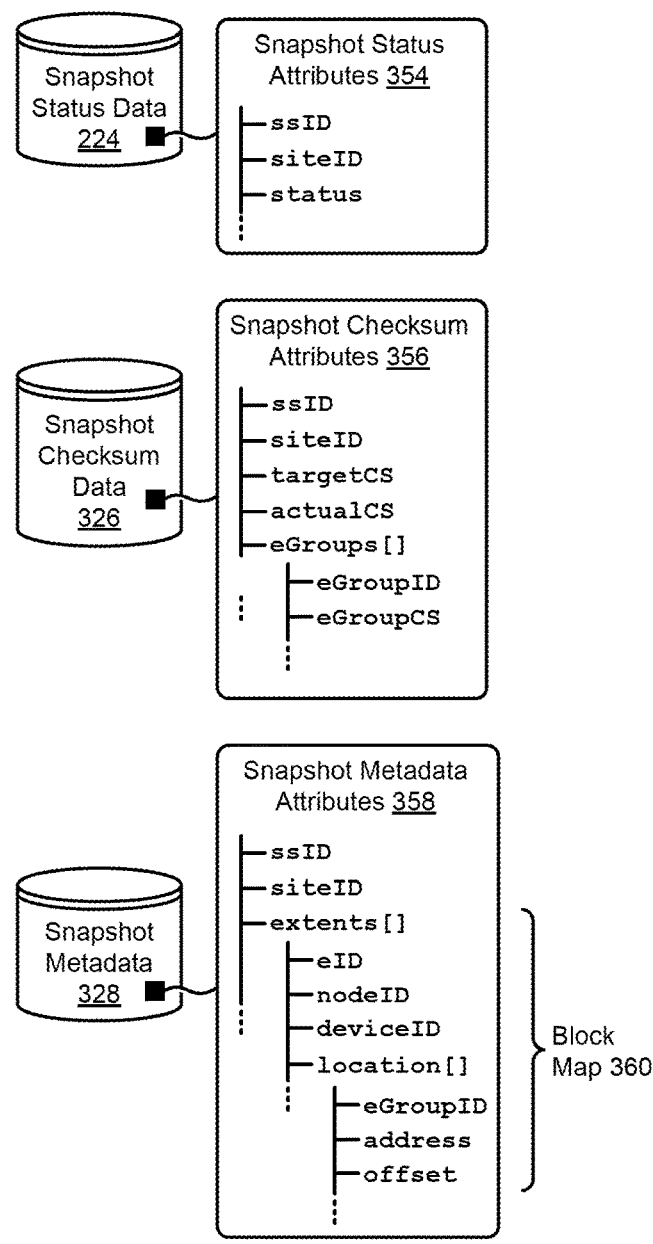
FIG. 3B depicts a set of representative data structures for organizing information in systems that facilitate integrity checking of replicated snapshots in distributed computing environments, according to an embodiment.

FIG. 3B depicts a set of representative data structures 3B00 for organizing information in systems that facilitate integrity checking of replicated snapshots in distributed computing environments. As an option, one or more variations of representative data structures 3B00 or any aspect thereof may be implemented in the context of the architecture and functionality of the embodiments described herein. The representative data structures 3B00 or any aspect thereof may be implemented in any environment.

FIG. 3B illustrates one aspect pertaining to checking the integrity of replicated snapshots that have been distributed over multiple storage devices. Specifically, the figure is being presented to illustrate one embodiment of data structures that can be implemented to organize certain data used when implementing the herein disclosed techniques. More specifically, representative data structures 3B00 improve the way a computer uses data in memory and/or communicates with other computers when performing operations facilitated by the herein disclosed techniques.

As can be observed, FIG. 3B depicts data structures associated with snapshot status data 224, snapshot checksum data 326, and snapshot metadata 328 that were all earlier described. The data sets described herein can be organized and/or stored using various techniques. For example, the data comprising snapshot status data 224 might be organized and/or stored in a tabular structure (e.g., relational database table) that has rows that relate various attributes, such as a unique identifier, that pertain to a particular snapshot. As another example, the information might be organized and/or stored in a programming code object that has instances corresponding to a particular snapshot and properties corresponding to the various attributes associated with the snapshot. As depicted by a set of snapshot status attributes 354, a status data record (e.g., table row or object instance) for a particular snapshot describes a snapshot identifier (e.g., stored in an "ssID" field), an identifier corresponding to the site (e.g., system, cluster) associated with the snapshot (e.g., stored in a "siteID" field), an indicator of the data integrity status of the snapshot (e.g., stored in a "status" field), and/or other attributes associated with the snapshot.

As depicted by a set of snapshot checksum attributes 356, a checksum data record (e.g., table row or object instance) for a particular snapshot describes a snapshot identifier (e.g., stored in an "ssID" field), an identifier corresponding to the site (e.g., system, cluster) associated with the snapshot (e.g., stored in a "siteID" field), a target checksum for the snapshot (e.g., stored in a "targetCS" field), an actual (e.g., then-current) checksum for the snapshot (e.g., stored in an "actualCS" field), a list of the extent groups that comprise the snapshot (e.g., stored in an "eGroups [ ]" object), and/or other attributes associated with the snapshot. As shown, each instance (e.g., extent group) of the "eGroups [ ]" object describes an extent group identifier (e.g., stored in an "eGroupID" field), a checksum for the extent group (e.g., stored in an "eGroupCS" object), and/or other extent group attributes.

Furthermore, a set of snapshot metadata attributes 358 indicates that a metadata record (e.g., table row or object instance) for a particular snapshot describes a snapshot identifier (e.g., stored in an "ssID" field), an identifier corresponding to the site (e.g., system, cluster) associated with the snapshot (e.g., stored in a "siteID" field), a list of extents that comprise the snapshot (e.g., stored in an "extents [ ]" object), and/or other attributes associated with the snapshot. As shown, each instance (e.g., extent) of the "extents [ ]" object describes an extent identifier (e.g., stored in an "eID" field), an identifier corresponding to the node associated with the extent (e.g., stored in a "nodeID" field), an identifier corresponding to the storage device associated with the extent (e.g., stored in a "deviceID" field), location information describing the physical location of the extent (e.g., stored in a "location [ ]" object), and/or other extent attributes. As further shown, each instance (e.g., for each extent) of the "location [ ]" object describes an identifier of the extent group associated with an extent (e.g., stored in an "eGroupID" field), the physical storage address of the data comprising the extent (e.g., stored in an "address" field), the physical storage offset of the data comprising the extent (e.g., stored in an "offset" field), and/or other attributes associated with the physical storage location of an extent. In some cases, certain combinations of the foregoing snapshot metadata serve to describe a block map 360 for a particular snapshot, which block map describes the logical-to-physical mapping of the "blocks" (e.g., extents) that comprise the snapshot.

Further details pertaining to techniques for storing portions of snapshots over a plurality of storage devices associated with a distributed computing system (step 204 of FIG. 2) are disclosed as follows.

Figure 4:
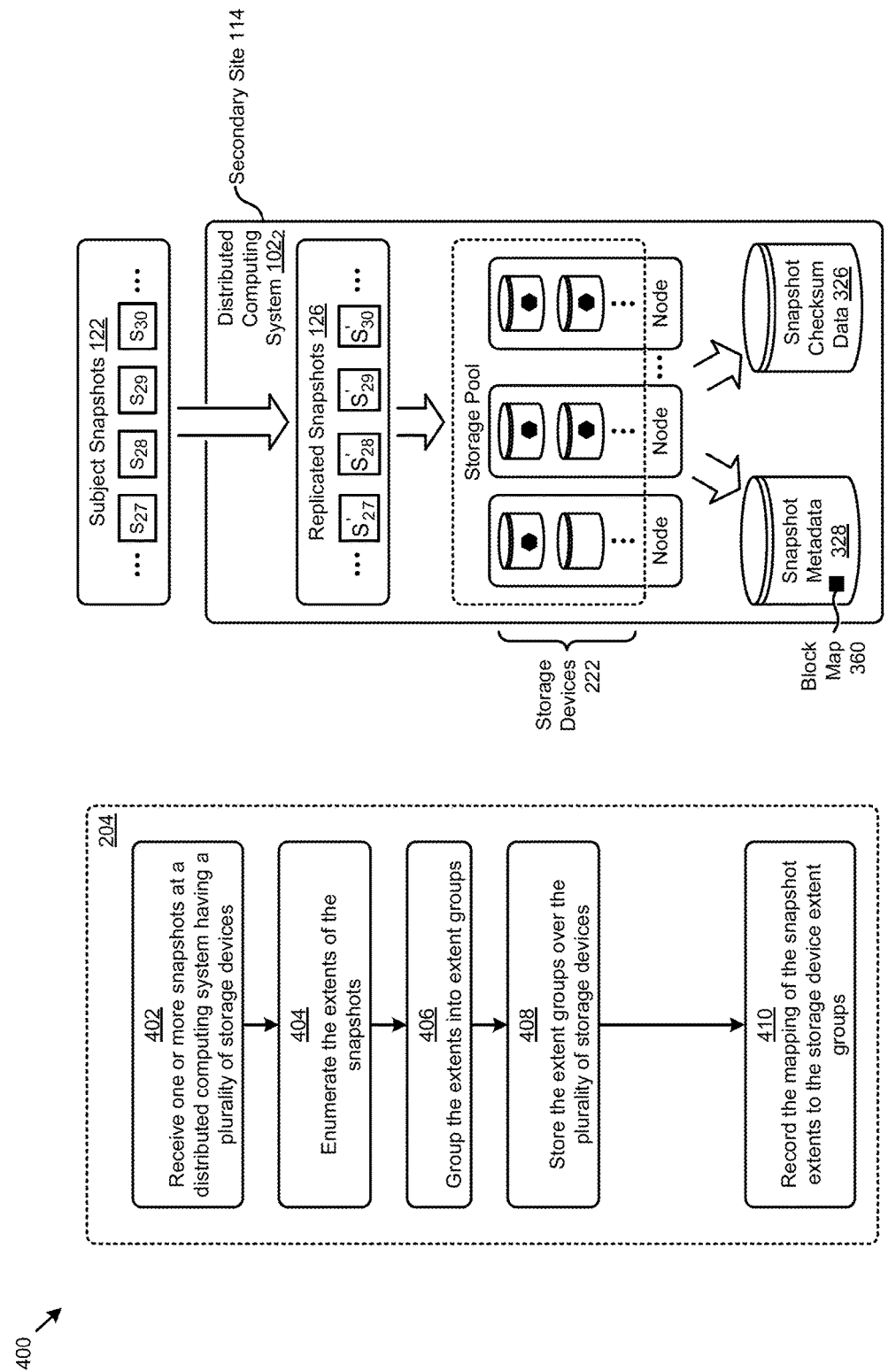
FIG. 4 presents a snapshot storage technique as implemented in systems that perform integrity checking of replicated snapshots in distributed computing environments, according to an embodiment.

FIG. 4 presents a snapshot storage technique 400 as implemented in systems that perform integrity checking of replicated snapshots in distributed computing environments. As an option, one or more variations of snapshot storage technique 400 or any aspect thereof may be implemented in the context of the architecture and functionality of the embodiments described herein. The snapshot storage technique 400 or any aspect thereof may be implemented in any environment.

FIG. 4 illustrates aspects pertaining to checking the integrity of replicated snapshots that have been distributed over multiple storage devices. Specifically, the figure is presented to illustrate one embodiment of certain steps and/or operations for storing portions of snapshots over a plurality of storage devices associated with a distributed computing system. As depicted in the figure, the steps and/or operations are associated with step 204 of FIG. 2. A representative scenario is also shown in the figure to illustrate an example application of snapshot storage technique 400.

Snapshot storage technique 400 commences by receiving one or more snapshots at a distributed computing system that comprises a plurality of storage devices (step 402). For example, replicas of a set of subject snapshots 122 might be received as replicated snapshots 126 at a distributed computing system $102_2$ that comprises a plurality of storage devices 222 organized in a storage pool. The extents of the snapshots (e.g., replicated snapshots 126) are enumerated (step 404) and grouped into extent groups (step 406). For example, the extents might be organized into extent groups associated with the storage devices based at least part on one or more performance objectives (e.g., load balancing).

The extent groups are stored over the plurality of storage devices at the distributed computing system (step 408). The mapping of the snapshot extents to the storage device extent groups is recorded (step 410). As illustrated, such mapping (e.g., block map 360) might be stored in the snapshot metadata 328 at distributed computing system $102_2$. In some embodiments, a target checksum (e.g., a checksum that was calculated when the snapshots were initially stored) is recorded. For example, a set of target checksums might be recorded in the snapshot checksum data 326 of distributed computing system $102_2$. In other embodiments, the target checksums (e.g., source-of-truth checksums that were calculated when the snapshots were initially stored) are maintained at the primary site for retrieval by a secondary site.

Such target checksums represent the checksums that should correspond to uncorrupted instances of the snapshots (e.g., replicated snapshots 126). As such, the target checksums can facilitate certain techniques for determining the data integrity status of snapshots (step 208 of FIG. 2), which techniques are discussed in further details as follows.

Figure 5:
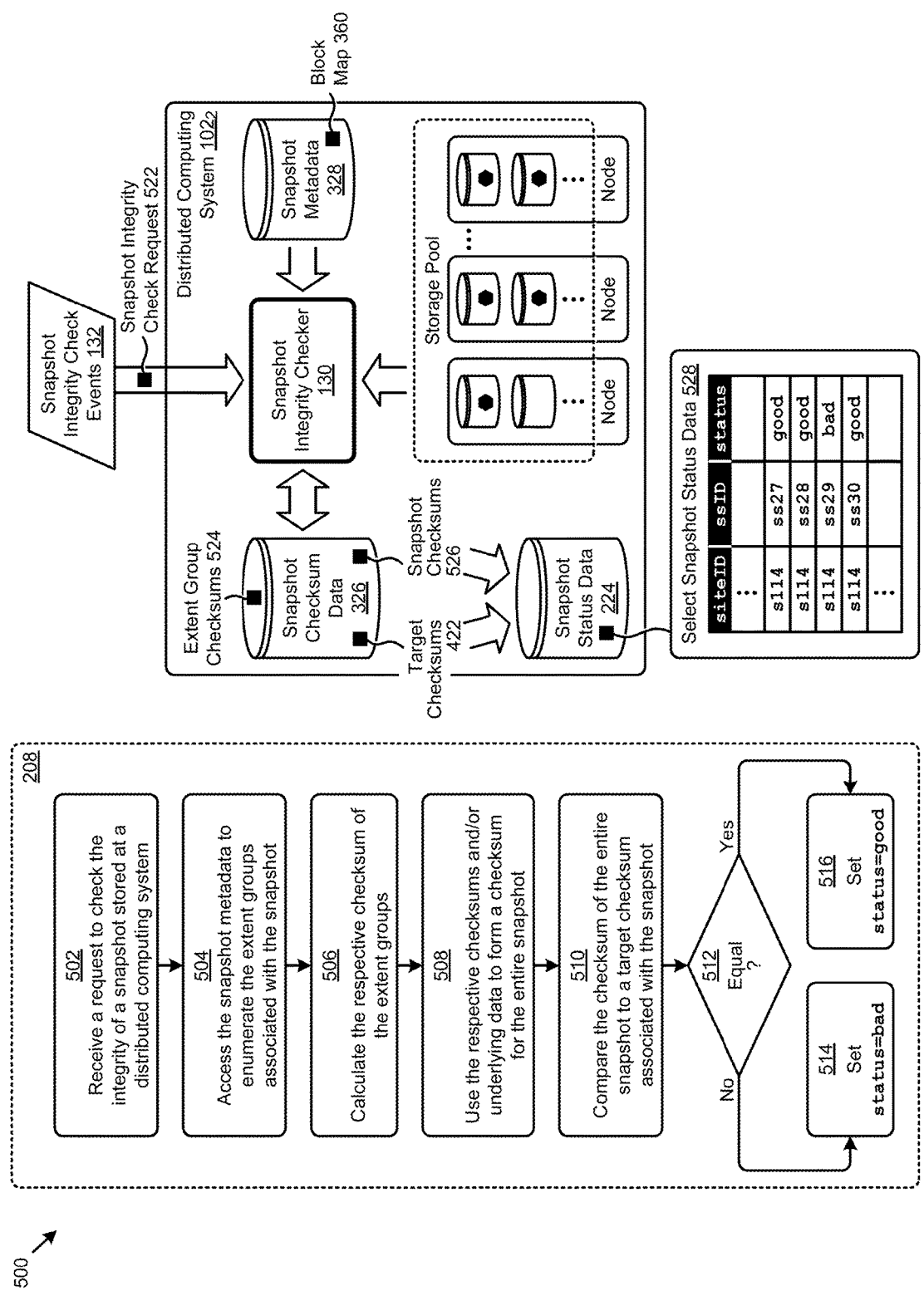
FIG. 5 presents a distributed snapshot verification technique as implemented in systems that perform integrity checking of replicated snapshots in distributed computing environments, according to an embodiment.

FIG. 5 presents a distributed snapshot verification technique 500 as implemented in systems that perform integrity checking of replicated snapshots in distributed computing environments. As an option, one or more variations of distributed snapshot verification technique 500 or any aspect thereof may be implemented in the context of the architecture and functionality of the embodiments described herein. The distributed snapshot verification technique 500 or any aspect thereof may be implemented in any environment.

FIG. 5 illustrates aspects pertaining to checking the integrity of replicated snapshots that have been distributed over multiple storage devices. Specifically, the figure is presented to illustrate one embodiment of certain steps and/or operations for determining the data integrity status of snapshots that are stored over a plurality of storage devices. As depicted in the figure, the steps and/or operations are associated with step 208 of FIG. 2. A representative scenario is also shown in the figure to illustrate an example application of distributed snapshot verification technique 500.

Distributed snapshot verification technique 500 commences by receiving a request to check the integrity of a snapshot stored at a distributed computing system (step 502). For example, a snapshot integrity check request 522 associated with a snapshot at distributed computing system $102_2$ might be received by an instance of snapshot integrity checker 130 at the system. As can be observed, snapshot integrity check request 522 or other requests might correspond to one or more instances of snapshot integrity check events 132, which events may be associated with disaster recovery events and/or background replication management operations and/or other operations. A set of snapshot metadata is accessed to enumerate the extent groups associated with the snapshot (step 504). As an example, block map 360 described by instances of snapshot metadata 328 can be accessed to determine the extent groups associated with the snapshot that are stored in the storage pool of distributed computing system $102_2$.

When the extent groups of the snapshot are identified, the extent groups are accessed to calculate the then-current checksums associated with each of the extent groups (step 506). In some cases, the then-current checksums can be stored as instances of extent group checksums 524 in snapshot checksum data 326. The extent group checksums and/or the data of the extent groups are then combined or otherwise analyzed to form a single checksum for the entire snapshot (step 508). Various techniques can be implemented to form the snapshot checksum. In some cases, multiple checksums corresponding to multiple storage extents can be combined to form a checksum for the combination of the multiple storage extents. In some cases, the order of combination of the multiple checksums corresponding to multiple storage extents is observed. In some cases, the data of the multiple storage extents is re-read and used to calculate a checksum for the entire snapshot.

The snapshot checksum can be stored as an instance of snapshot checksums 526 in snapshot checksum data 326. The checksum for the snapshot is compared to a target checksum (e.g., from target checksums 422) that corresponds to the snapshot (step 510).

If the checksum does not equal the target checksum ("No" path of decision 512), then the "status" field associated with the snapshot is set to "bad" in snapshot status data 224 (step 514). If the checksum equals the target checksum ("Yes" path of decision 512), then the "status" field associated with the snapshot is set to "good" in snapshot status data 224 (step 516). As shown in a set of select snapshot status data 528 from snapshot status data 224, some snapshots (e.g., snapshots "ss27", "ss28", and "ss30") associated with distributed computing system $102_2$ (e.g., "site=s114") are determined to be "good" at a particular moment in time, whereas other snapshots (e.g., snapshot "ss29") are determined to be "bad" at a particular moment in time. In some embodiments, a determination that a snapshot is "bad" raises events or alerts.

The foregoing discussions include aspects of operations at and/or between components of one or more distributed computing systems that facilitate implementations of the herein disclosed techniques. Such operations can be performed in many environments and/or carried out to accommodate many use models and/or scenarios, some of which are disclosed in further detail as follows.

Figure 6:
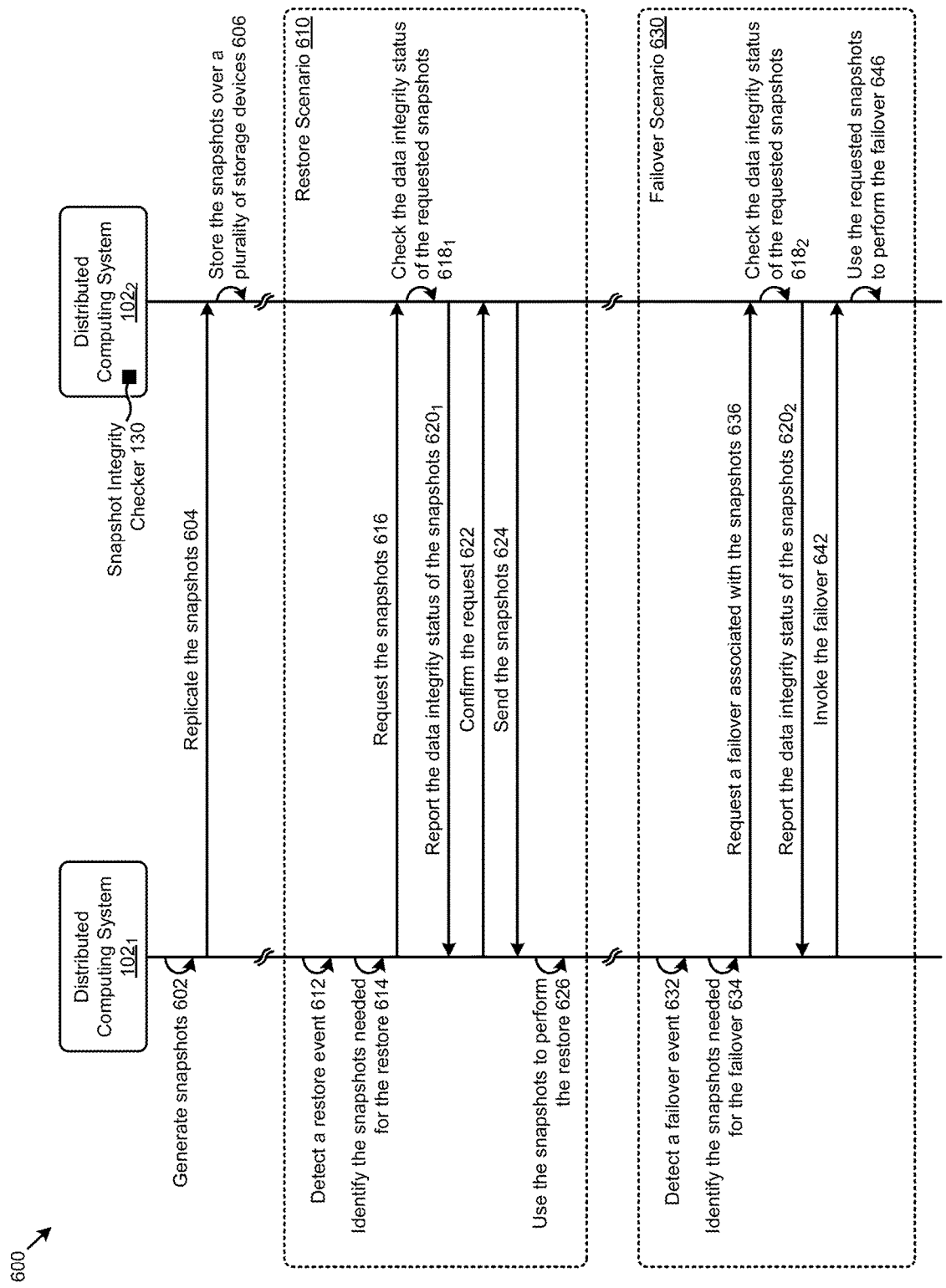
FIG. 6 is a diagram depicting a set of representative disaster recovery scenarios as performed at systems that facilitate integrity checking of replicated snapshots in distributed computing environments, according to an embodiment.

FIG. 6 is a diagram depicting a set of representative disaster recovery scenarios 600 as performed at systems that facilitate integrity checking of replicated snapshots in distributed computing environments. As an option, one or more variations of representative disaster recovery scenarios 600 or any aspect thereof may be implemented in the context of the architecture and functionality of the embodiments described herein. The representative disaster recovery scenarios 600 or any aspect thereof may be implemented in any environment.

FIG. 6 illustrates aspects pertaining to checking the integrity of replicated snapshots that have been distributed over multiple storage devices. Specifically, the figure is being presented to illustrate two representative disaster recovery scenarios that involve checking the integrity of the snapshots associated with certain disaster recovery operations before performing assembly and restoration operations. More specifically, various high order interactions (e.g., operations, messages, etc.) of a restore scenario 610 and a failover scenario 630 associated with distributed computing system $102_1$ and distributed computing system $102_2$ are depicted.

As shown in FIG. 6, certain snapshots that are generated at distributed computing system 1021 (operation 602) are replicated to distributed computing system $102_2$ (message 604). The replicated snapshots are stored over a plurality of storage devices at the distributed computing system $102_2$ (operation 606). The plurality of storage devices may be distributed across a large logical and/or physical space. In some cases, multiple storage devices are associated with a computing node. In some cases, the nodes and their associated storage devices are distributed across one or more networks and/or might be situated in different subnets. In some deployments any two nodes might be situated in different cities such that the two nodes are connected over a wide area network. In some cases, a storage device of a first node stores a first copy of a snapshot or portion thereof while a storage device of a second node stores a replica copy of the snapshot or portion thereof. More specifically, in system that implement replication of blocks or extents, one or more replicas of a particular block or extent can be replicated to a different storage device. In the event that a subject block or extent fails a checksum test, then a replica block or extent can be retrieved and subjected to the checksum test. In some cases, the replica block or extent might pass the checksum test whereas the subject block or extent fails the checksum test.

At some moment in time, restore scenario 610 commences with a restore event being detected at distributed computing system 1021 (operation 612). As an example, the restore event might be invoked by a system administrator who wants to restore a set of vDisks (e.g., that have been corrupted, accidentally deleted, etc.) using the replicated snapshots.

The snapshots needed to perform the restore are identified (operation 614) and a request for the snapshots are issued to distributed computing system $102_2$ (message 616). In response to the request, the data integrity status of the requested snapshots is checked (operation $618_1$). Specifically, prior to communication (e.g., over a network) of the constituent portions of a particular snapshot, the checksums of the constituent portions of a particular snapshot are accessed and combined so as to produce a checksum for the whole of the particular snapshot. In some cases, a particular checksum function is selected specifically because it can be used in an order independent manner. A checksum for a snapshot composed of constituents "A" and "B" can have a target checksum for the snapshot, and that target checksum can be arrived at by combining the checksums from constituent "A" and constituent "B", in that order. Similarly, a checksum for a snapshot composed of constituents "A" and "B" can have a target checksum for the snapshot, and that target checksum can be arrived at by combining the checksums from constituent "B" and constituent "A", in that order.

In this embodiment, and as shown, the snapshot integrity checker 130 at distributed computing system $102_2$ checks the data integrity status of the snapshots according to the herein disclosed techniques. The then-current data integrity status of the snapshots is reported to distributed computing system $102_1$ (message $620_1$). If the data integrity status for the snapshots indicates the snapshots are not corrupted, then the request is confirmed (message 622) and distributed computing system $102_2$ assembles a copy of the uncorrupted replicated snapshots and provides the uncorrupted replicated snapshots to distributed computing system $102_1$ (message 624). If one or more of the snapshots is corrupted, then a different snapshot or set of snapshots (e.g., from an earlier-created set from an earlier moment in time) might be selected, requested, and checked before assembly of the constituent data into an uncorrupted snapshot. The acts of checking integrity values (e.g., values calculated from checksums of the constituent data of a snapshot) to confirm that an assembled snapshot would be uncorrupted are carried out before assembly of the constituent data into an uncorrupted snapshot. Moreover, acts of checking integrity values to determine if a fully assembled snapshot would be corrupted can include retrieving and checking only integrity values without the need to retrieve the entirety of the constituent data. This serves to eliminate use of network bandwidth and CPU cycles that would be wastefully consumed if the assembly were to result in a known-to-be corrupted snapshot. As one example to avoid wasteful consumption, the aforementioned constituent data might be stored in 1 megabyte extents, whereas the integrity values corresponding to the constituent data might be stored in much smaller extents, or might be stored as metadata that is accessible from much smaller entries in a file system directory or in a database.

Only uncorrupted snapshots are used to perform the restore at distributed computing system $102_1$ (operation 626). If there are no uncorrupted snapshots that correspond to the request, then no snapshot is returned to the requesting computing system.

At some other moment in time, failover operations of failover scenario 630 commences with a failover event being detected at distributed computing system $102_1$ (operation 632). As an example, the failover event might be invoked by a node failure at distributed computing system 1021 that affects one or more virtualized entities (e.g., VMs, vDisks, etc.). The snapshots needed to perform the failover are identified (operation 634) and a failover associated with the snapshots at distributed computing system $102_2$ is requested (message 636). For example, the snapshots identified might be the set of snapshots that are needed to bring up the failed virtualized entities (e.g., VMs, vDisks, etc.) at distributed computing system $102_2$.

In response to the detecting the failover, the data integrity status of the identified snapshots is checked (operation $618_2$). Specifically, snapshot integrity checker 130 at distributed computing system $102_2$ checks the data integrity status of the requested snapshots according to the herein disclosed techniques. The then-current data integrity status of the snapshots is reported to distributed computing system $102_1$ (message $620_2$). If the data integrity status for the snapshots indicates the snapshots are not corrupted, then the failover is invoked (message 642) and the snapshots are used to perform the failover at distributed computing system $102_2$ (operation 646). If one or more of the snapshots is corrupted, then a different set of snapshots (e.g., snapshots from an earlier moment in time) might be selected, checked, and used to perform the failover.

Additional Embodiments of the Disclosure

Additional Practical Application Examples

Figure 7A:
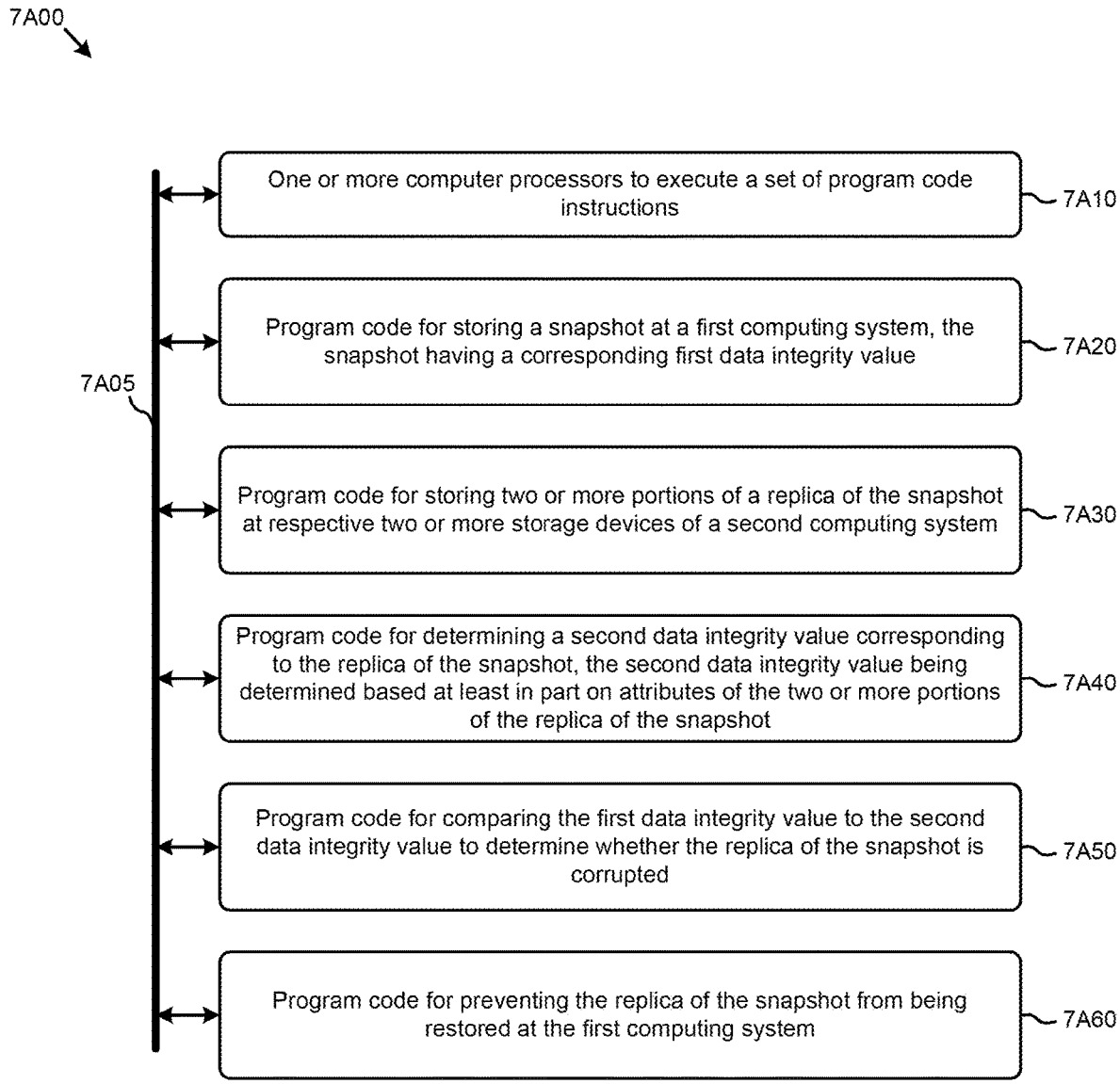
FIG. 7A and FIG. 7B depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. This and other embodiments present particular arrangements of elements that, individually or as combined, serve to form improved technological processes that address discovering that a replicated snapshot is corrupted during or after executing disaster recovery operations. The partitioning of system 7A00 is merely illustrative and other partitions are possible. As an option, the system 7A00 may be implemented in the context of the architecture and functionality of the embodiments described herein. Of course, however, the system 7A00 or any operation therein may be carried out in any desired environment.

The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with any other operations over communication path 7A05. The modules of the system can, individually or in combination, perform method operations within system 7A00. Any operations performed within system 7A00 may be performed in any order unless as may be specified in the claims.

The shown embodiment implements a portion of a computer environment, presented as system 7A00, comprising one or more computer processors to execute a set of program code instructions (module 7A10) and modules for accessing memory to hold program code instructions to perform: storing a snapshot at a first computing system, the snapshot having a corresponding first data integrity value (module 7A20); storing two or more portions of a replica of the snapshot at respective two or more storage devices of two or more nodes of a second computing system (module 7A30); determining a second data integrity value corresponding to the replica of the snapshot, the second data integrity value being determined based at least in part on attributes of the two or more portions of the replica of the snapshot (module 7A40); comparing the first data integrity value to the second data integrity value to determine whether the replica snapshot is corrupted (module 7A50); and preventing the replica of the snapshot from being restored at the first computing system (module 7A60).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

Figure 7B:
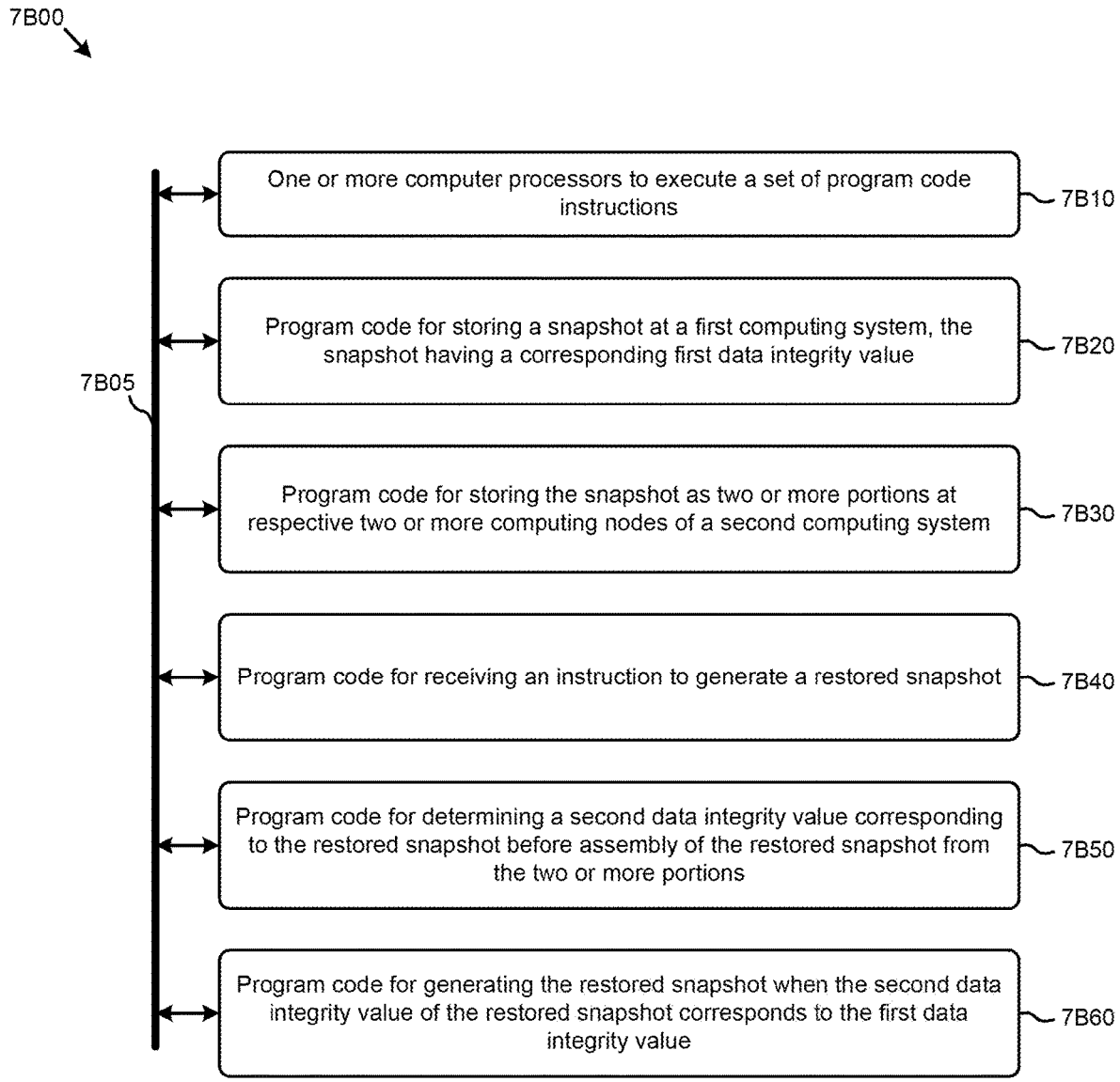

FIG. 7B depicts a system 7B00 as an arrangement of computing modules that are interconnected so as to operate cooperatively to implement certain of the herein-disclosed embodiments. This and other embodiments present particular arrangements of elements that, individually or as combined, serve to form improved technological processes that address discovering that a replicated snapshot is corrupted during or after executing disaster recovery operations. The partitioning of system 7B00 is merely illustrative and other partitions are possible. As an option, the system 7B00 may be implemented in the context of the architecture and functionality of the embodiments described herein. Of course, however, the system 7B00 or any operation therein may be carried out in any desired environment. The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with any other operations over communication path 7B05. The modules of the system can, individually or in combination, perform method operations within system 7B00. Any operations performed within system 7B00 may be performed in any order unless as may be specified in the claims. The shown embodiment implements a portion of a computer system, presented as system 7B00, comprising one or more computer processors to execute a set of program code instructions (module 7B10) and modules for accessing memory to hold program code instructions to perform: storing a snapshot at a first computing system, the snapshot having a corresponding first data integrity value (module 7B20); storing the snapshot as two or more portions at respective two or more computing nodes of a second computing system (module 7B30); receiving an instruction to generate a restored snapshot (module 7B40); determining a second data integrity value corresponding to the restored snapshot before assembly of the restored snapshot from the two or more portions (module 7B50); and generating the restored snapshot when the second data integrity value of the restored snapshot corresponds to the first data integrity value (module 7B60).

System Architecture Overview

Additional System Architecture Examples

Figure 8A:
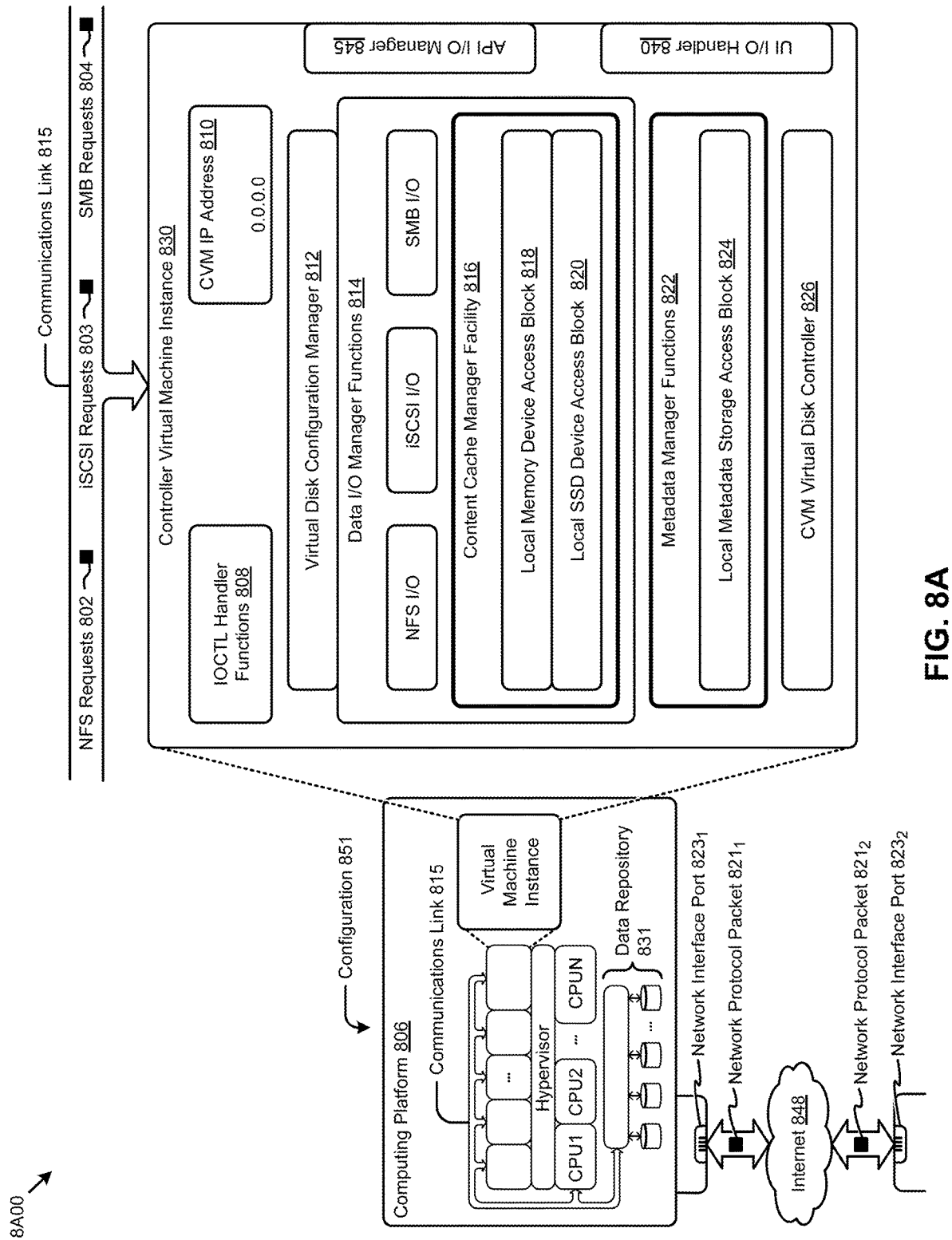
FIG. 8A, FIG. 8B, and FIG. 8C depict virtualized controller architectures comprising collections of interconnected components suitable for implementing embodiments of the present disclosure and/or for use in the herein-described environments.

FIG. 8A depicts a virtualized controller as implemented by the shown virtual machine architecture 8A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 8A00 comprises a collection of interconnected components suitable for implementing embodiments of the present disclosure and/or for use in the herein-described environments. Moreover, virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O as received from any or every source within the computing platform. An example implementation of such a virtual machine that processes storage I/O is depicted as 830.

In this and other configurations, a controller virtual machine instance receives block I/O storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 830 includes content cache manager facility 816 that accesses storage locations, possibly including local dynamic random access memory (DRAM) (e.g., through local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

Computing platform 806 may transmit and receive messages that can be composed of configuration data and/or any other forms of data and/or instructions organized into a data structure (e.g., communications packets). In some cases, the data structure includes program code instructions (e.g., application code) communicated through the Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or the results of executing program code can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to verifying the integrity of replicated snapshots in distributed computing environments. In some embodiments, a module may include one or more state machines and/or combinational logic used to implement or facilitate the operational and/or performance characteristics pertaining to verifying the integrity of replicated snapshots in distributed computing environments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of verifying the integrity of replicated snapshots in distributed computing environments). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to verifying the integrity of replicated snapshots in distributed computing environments, and/or for improving the way data is manipulated when performing computerized operations pertaining to checking the integrity of replicated snapshots that have been distributed over multiple storage devices.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
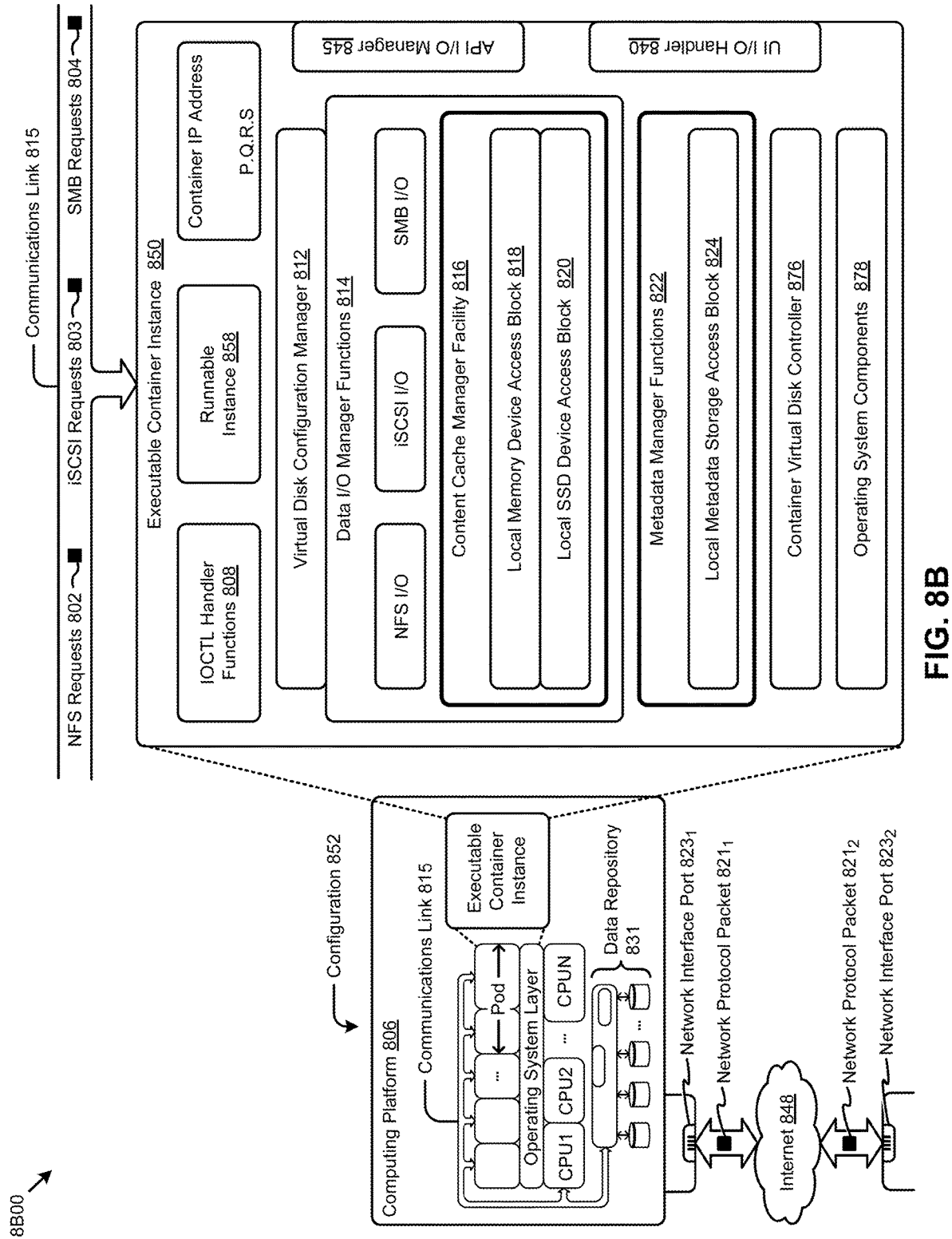

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to executable container instance 850. Configuration 852 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls-a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
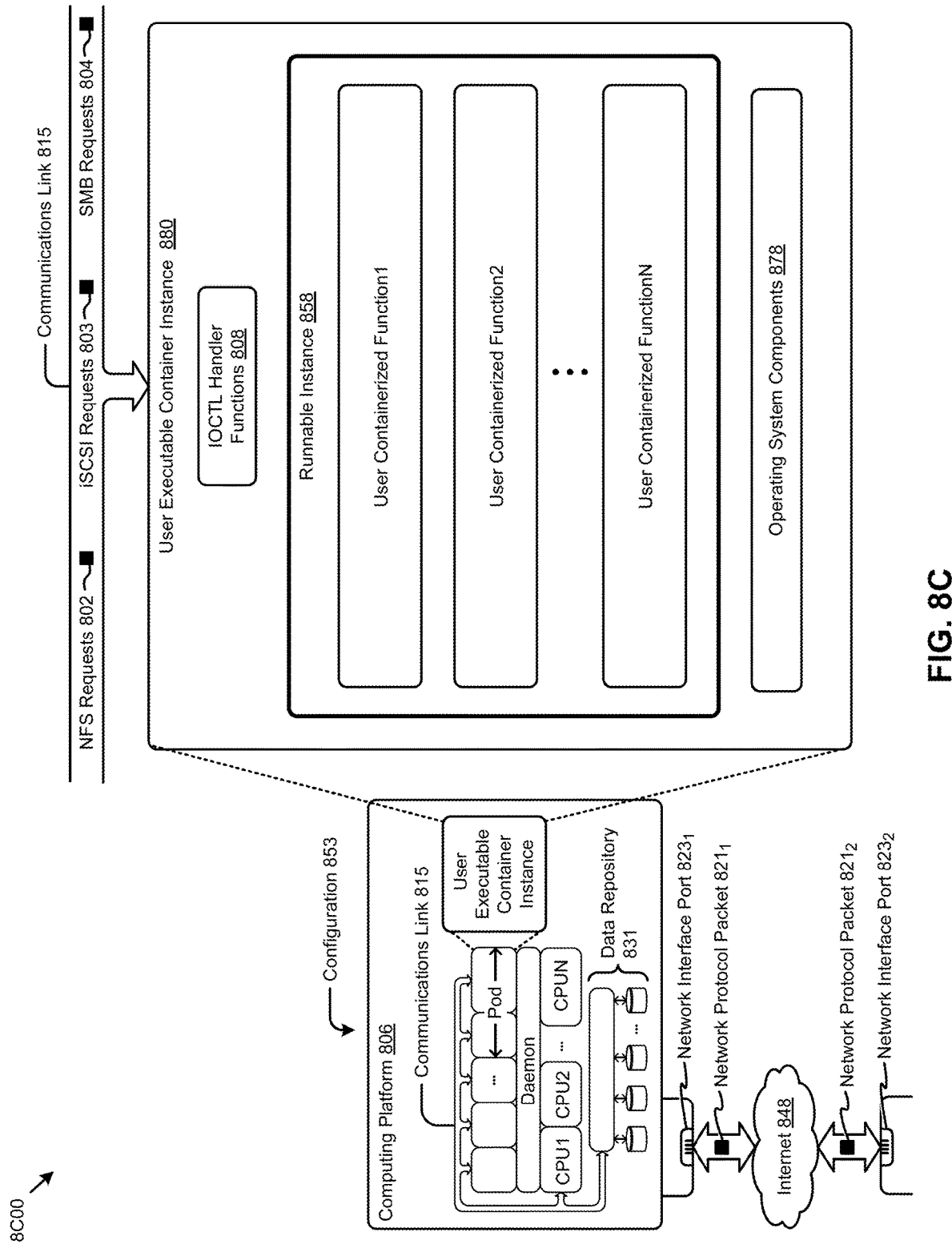

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown daemon-assisted containerized architecture includes a user executable container instance in configuration 853 that is further described as pertaining to user executable container instance 880. Configuration 853 includes a daemon layer (as shown) that performs certain functions of an operating system.

User executable container instance 880 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 880.

The virtual machine architecture 8A00 of FIG. 8A and/or the containerized architecture 8B00 of FIG. 8B and/or the daemon-assisted containerized architecture 8C00 of FIG. 8C can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage may include storage that is accessible over communications link 815. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 851 of FIG. 8A) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor causes a set of acts, the set of acts comprising:

storing a snapshot at a first computing system, the snapshot having a first data integrity value;

storing a copy of the snapshot as a replicated snapshot comprising a plurality of portions at a second computing system, respective portions of the plurality of portions being stored at respective computing nodes of the second computing system, wherein a first portion of the plurality of portions is stored at a first computing node of the plurality of computing nodes and a second portion of the plurality of portions is stored at a second computing node, the first and second computing nodes being different computing nodes;

detecting an event corresponding to verification of integrity of the replicated snapshot;

determining, in response to the event, a second data integrity value corresponding to the replicated snapshot based on the plurality of portions of the replicated snapshot at the second computing system; and determining, if the replicated snapshot can be assembled from the plurality of portions, based on at least whether the second data integrity value corresponds to the first data integrity value.

2. The non-transitory computer readable medium of claim 1, wherein the first data integrity value is an MD5 checksum and the second data integrity value is an MD5 checksum.

3. The non-transitory computer readable medium of claim 1, wherein the second data integrity value is based at least in part on a plurality of checksums of respective portions of the snapshot stored at least at the plurality of computing nodes.

4. The non-transitory computer readable medium of claim 3, wherein the second data integrity value is based at least in part on a plurality of checksums of respective portions of the snapshot stored at least at the plurality of computing nodes.

5. The non-transitory computer readable medium of claim 3, wherein at least one of the plurality of portions of the snapshot stored at the plurality of computing nodes is an extent, a data block, or an extent group.

6. The non-transitory computer readable medium of claim 1, wherein the set of acts further comprise raising an alert when the replicated snapshot contains corrupted data.

7. A method comprising:
storing a snapshot at a first computing system, the snapshot having a first data integrity value;
storing a copy of the snapshot as a replicated snapshot comprising a plurality of portions at a second computing system, respective portions of the plurality of portions being stored at respective computing nodes of the second computing system, wherein a first portion of the plurality of portions is stored at a first computing node of the plurality of computing nodes and a second portion of the plurality of portions is stored at a second computing node, the first and second computing nodes being different computing nodes;
detecting an event corresponding to verification of integrity of the replicated snapshot;
determining, in response to the event, a second data integrity value corresponding to the replicated snapshot based on the plurality of portions of the replicated snapshot at the second computing system; and
determining, if the replicated snapshot can be assembled from the plurality of portions, based on at least whether data integrity value corresponds to the first data integrity value.

8. The method of claim 7, wherein the first data integrity value is an MD5 checksum and the second data integrity value is an MD5 checksum.

9. The method of claim 7, wherein the second data integrity value is based at least in part on a plurality of checksums of respective two or portions of the snapshot stored at least at the plurality of computing nodes.

10. The method of claim 9, wherein at least one of the plurality of portions of the snapshot stored at the plurality of computing nodes is an extent, a data block, or an extent group.

11. The method of claim 7, further comprising raising an alert when the replicated snapshot contains corrupted data.

12. The method of claim 7, further comprising providing a copy of the replicated snapshot when it is determined that the replicated snapshot can be assembled from the plurality of portions.

13. The method of claim 7, further comprising initiating one or more failover operations when it is not determined that the replicated snapshot can be assembled from the plurality of portions.

14. The method of claim 7, wherein the plurality of computing nodes of the second computing system comprises a plurality of storage devices that are collected to form a storage pool having a contiguous address space.

15. A system comprising:
a storage medium having stored thereon a sequence of instructions; and
one or more processors that execute the sequence of instructions to cause the one or more processors to perform a set of acts, the set of acts comprising,
storing a snapshot at a first computing system, the snapshot having a first data integrity value;
storing a copy of the snapshot as a replicated snapshot comprising a plurality of portions at a second computing system, respective portions of the plurality of portions being stored at respective computing nodes of the second computing system, wherein a first portion of the plurality of portions is stored at a first computing node of the plurality of computing nodes and a second portion of the plurality of portions is stored at a second computing node, the first and second computing nodes being different computing nodes;
detecting an event corresponding to verification of integrity of the replicated snapshot;
determining, in response to the event, a second data integrity value corresponding to the replicated snapshot based on the plurality of portions of the replicated snapshot at the second computing system; and
determining, if the replicated snapshot can be assembled from the plurality of portions, based on at least whether the second data integrity value corresponds to the first data integrity value.

16. The system of claim 15, wherein the second data integrity value is based at least in part on a plurality of checksums of respective portions of the snapshot stored at least at the plurality of computing nodes.

17. The system of claim 15, wherein the first data integrity value is an MD5 checksum and the second data integrity value is an MD5 checksum.

18. The system of claim 16, wherein at least one of the plurality of portions of the snapshot stored at the plurality of computing nodes is an extent, a data block, or an extent group.

19. The system of claim 15, wherein the set of acts further comprise raising an alert when the replicated snapshot contains corrupted data.

20. The system of claim 15, wherein the set of acts further comprise providing a copy of the replicated snapshot when it is determined that the replicated snapshot can be assembled from the plurality of portions.

21. The system of claim 15, wherein the set of acts further comprise initiating one or more failover operations when it is not determined that the replicated snapshot can be assembled from the plurality of portions.

22. The system of claim 15, wherein the plurality of computing nodes of the second computing system comprises a plurality of storage devices that are collected to form a storage pool having a contiguous address space.

23. The non-transitory computer readable medium of claim 1, wherein the set of acts further comprise providing a copy of the replicated snapshot when it is determined that the replicated snapshot can be assembled from the plurality of portions.

24. The non-transitory computer readable medium of claim 1, further comprising initiating one or more failover operations when it is not determined that the replicated snapshot can be assembled from the plurality of portions.

25. The non-transitory computer readable medium of claim 1, wherein the plurality of computing nodes of the second computing system comprises a plurality of storage devices that are collected to form a storage pool having a contiguous address space.

* * * * *